(12) United States Patent
Bordawekar et al.

(10) Patent No.: US 11,244,224 B2
(45) Date of Patent: Feb. 8, 2022

(54) COMPARING TIME SERIES DATA USING CONTEXT-BASED SIMILARITY

(71) Applicant: International Business Machines Corporation, Armonk, NY (US)

(72) Inventors: Rajesh Bordawekar, Westchester, NY (US); Tin Kam Ho, Miburn, NJ (US)

(73) Assignee: International Business Machines Corporation, Armonk, NY (US)

( * ) Notice: Subject to any disclaimer, the term of this patent is extended or adjusted under 35 U.S.C. 154(b) by 933 days.

(21) Appl. No.: 15/926,109

(22) Filed: Mar. 20, 2018

(65) Prior Publication Data

US 2019/0294953 A1     Sep. 26, 2019

(51) Int. Cl.
*G06N 3/04*     (2006.01)
*G06K 9/62*     (2006.01)
*G06N 5/04*     (2006.01)
*G06N 20/00*    (2019.01)

(52) U.S. Cl.
CPC .......... *G06N 3/0454* (2013.01); *G06K 9/627* (2013.01); *G06N 5/047* (2013.01); *G06N 20/00* (2019.01)

(58) Field of Classification Search
CPC ...... G06N 3/0454; G06N 20/00; G06N 5/047; G06K 9/627
See application file for complete search history.

(56) References Cited

U.S. PATENT DOCUMENTS

| 7,603,274 | B2 | 10/2009 | Hwang |
| 8,027,862 | B2 | 9/2011 | Sakurai et al. |
| 8,738,563 | B2 | 5/2014 | Shehory et al. |
| 2017/0024466 | A1 | 1/2017 | Bordawekar et al. |

FOREIGN PATENT DOCUMENTS

EP     814413 A1     12/1997

OTHER PUBLICATIONS

Hota, H., Time Series Data Prediction Using Sliding Window Based RBF Neural Network, [retrieved Nov. 8, 2021], Retrieved from Internet:<http://www.ripublication.com/ijcir17/ijcirv13n5_46.pdf> (Year: 2017).*

(Continued)

*Primary Examiner* — Miranda M Huang
*Assistant Examiner* — Bart I Rylander
(74) *Attorney, Agent, or Firm* — Patterson + Sheridan, LLP (57) ABSTRACT

A first observation window in a first time series is identified. The first observation window is preceded by a first portion of the first time series. A neural network is trained using the first portion of the first time series and the first observation window, and weights are extracted from the middle layers of the neural network. A first feature vector is generated based on the weights. A second observation window in a second time series is identified, where the second observation window is preceded by a first portion of the second time series. A second feature vector associated with the second observation window is determined. The second feature vector is based at least in part on the first set of weights. A similarity between the first and second observation windows is determined based on comparing the first feature vector and the second feature vector.

20 Claims, 8 Drawing Sheets

(56) References Cited

OTHER PUBLICATIONS

Kohzadi, N., A comparison of artificial neural network and time series models for forecasting commodity prices, [retrieved Nov. 8, 2021 ]. Retrieved from Internet:<https://www.sciencedirect.com/science/article/pii/0925231295000208> (Year: 1995).*

Hayashi, A., Embedding time series data for classification, [retrieved Nov. 8, 2021], Retrieved from Internet:<https://link.springer.com/chapter/10.1007/11510888_35> (Year: 2005).*

Lin, J., Finding Structural Similarity in Time Series Data Using Bag-of-Patterns Representation, [retrieved Nov. 8, 2021], Retrieved from Internet:<https://link.springer.com/chapter/10.1007/978-3-642-02279-1_33> (Year: 2009).*

Furlanello, T., Born-Again Neural Networks, [retrieved Nov. 8, 2021], Retrieved from Internet:<http://proceedings.mlr.press/v80/furlanello18a.html> (Year: 2018).*

Yanqing Ye, Caiyun Niu, Jiang Jiang, Bingfeng Ge, and Kewei Yang, "A Shape Based Similarity Measure for Time Series Classification with Weighted Dynamic Time Warping Algorithm," 2017 4th International Conference on Information Science and Control Engineering (ICISCE), Year: 2017, pp. 104-109.

Jiayi Ma, Ming Yang, Xueshan Han, and Zhi Li, "Ultra-short-term wind generation forecast based on multivariate empirical dynamic modeling," 2017 IEEE Industry Applications Society Annual Meeting, Year: 2017, pp. 1-8.

Aditya Patel, Izzatbir Singh, Landon Brand, and Roheet Rao, "A weighted similarity measure approach to predict intensive care unit transfers," 2017 IEEE International Conference on Bioinformatics and Biomedicine (BIBM), Year: 2017, pp. 1079-1084.

Berkay Aydin, Ahmet Kucuk, Soukaina Filali Boubrahimi, and Ratal A. Angryk, "Top-(R%, K) Spatiotemporal Event Sequence Mining," 2017 IEEE International Conference on Data Mining Workshops (ICDMW), Year: 2017, pp. 250-257.

Jessica Lin, Yuan Li, Finding Structural Similarity in Time Series Data Using Bag-of-Patterns Representation, Proc. of the International Conference on Scientific and Statistical Database Management (SSDBM) 2009, pp. 461-477.

Akira Hayashi, Yuko Mizuhara, Nobuo Suematsu, Embedding Time Series Data for Classification, Proc. of the International Workshop on Machine Learning and Data Mining in Pattern Recognition (MLDM) 2005, pp. 356-365.

* cited by examiner

COMPARING TIME SERIES DATA USING CONTEXT-BASED SIMILARITY

BACKGROUND

The present disclosure relates to time series analysis, and more specifically, to conducting time series analysis based on the context surrounding a window of interest.

A time series is a sequence of data ordered according to time. For example, a time series related to weather may include data about the temperature at a particular location across a period of time. A time series may be continuous (e.g., represented by a function that provides a data value for each moment in time) or discrete (e.g., a set of data points sampled at discrete time intervals). Additionally, in some instances, it is useful to approximate a discretized time series with one or more continuous functions in order to visualize trends or predict changes in the data, or to discretize a continuous time series.

It is often useful to compare various time series in order to determine the similarity between disparate times, places, and data subjects. For example, a time series representing temperature data from weeks ago may be useful to predict the temperature tomorrow. Similarly, a time series including temperature data from a physical location can be compared to a similar data series for another location. Additionally, in some instances, time series data collected on a first subject (e.g., temperature) may be compared with other time series data (e.g., relating to energy usage) to identify relationships between the data subjects and predict future values of each. Existing solutions to compare time series data are incomplete and overly limiting.

SUMMARY

According to one embodiment of the present disclosure, a method is provided. The method includes identifying a first observation window defining a period of time in a first time series, where the first observation window is preceded by a first portion of the first time series. The method includes training a first neural network based on the first portion of the first time series and the first observation window, and a first set of weights are extracted from one or more middle layers of the first neural network. The method also includes generating a first feature vector for the first observation window, based at least in part on the first set of weights. A second observation window defining a period of time in a second time series is identified, where the second observation window is preceded by a first portion of the second time series. The method further includes determining a second feature vector associated with the second observation window, where the second feature vector is based at least in part on the first set of weights, and determining a window similarity between the first observation window and the second observation window based at least in part on comparing the first feature vector and the second feature vector.

According to a second embodiment of the present disclosure, a system is provided. The system includes one or more computer processors and a memory containing a program which when executed by the one or more computer processors performs an operation. The operation includes receiving a first time series and a second time series. The operation further includes identifying a first observation window defining a period of time in the first time series, and identifying a second observation window defining a period of time in the second time series. Additionally, a preceding similarity measure is generated by comparing a first portion of the first time series with a first portion of the second time series, wherein the first portion of the first time series precedes the first observation window and the first portion of the second time series precedes the second observation window. Finally, the operation further includes determining a window similarity between the first observation window and the second observation window based at least in part on the generated preceding similarity measure.

According to a third embodiment of the present disclosure, a computer program product is provided. The computer program product comprises a computer-readable storage medium having computer-readable program code embodied therewith, the computer-readable program code executable by one or more computer processors to perform an operation. The operation includes identifying a first observation window defining a period of time in a first time series, where the first observation window is preceded by a first portion of the first time series. The operation also includes training a first neural network based on the first portion of the first time series and the first observation window, and a first set of weights are extracted from one or more middle layers of the first neural network. The operation further includes generating a first feature vector for the first observation window, based at least in part on the first set of weights. A second observation window defining a period of time in a second time series is identified, where the second observation window is preceded by a first portion of the second time series. The operation further includes determining a second feature vector associated with the second observation window, where the second feature vector is based at least in part on the first set of weights, and determining a window similarity between the first observation window and the second observation window based at least in part on comparing the first feature vector and the second feature vector.

DETAILED DESCRIPTION

With existing methodologies, time series are compared based on comparing data from selected windows of interest.

That is, to identify other time series that are similar to the selected time series, the segments of data that are to be compared must first be determined. If the user is interested in identifying time series data similar to the data that was collected during a first time period, existing solutions allow comparison of that first time period to other time series data based on the data values contained within the first time period. These solutions typically utilize similarity functions defined based on the value per time step within the identified time segment (e.g., data captured today, sampled every five minutes). Thus, existing solutions define similarity based on the values within the time window that the user is interested in, without consideration for the context of that time window. Embodiments of the present disclosure enable time series analysis based on the context of the concerned time window, rather than simply based on the data values within the time window itself.

For example, suppose time series data is collected and delineated into hourly segments. When identifying other time segments that are similar to a particular time segment, existing solutions involve a comparison of the data within the particular time segment to the data within the other identified time segments. Embodiments of the present disclosure, however, involve analysis of the data that precedes the particular time window, rather than simply the data within the time window. Similarly, in some embodiments, the subsequent data (e.g., the time segment that follows the selected time window) is analyzed to identify similar to related time series segments. In this way, embodiments of the present disclosure utilize the context of the window of interest to identify related time series, which can help to identify similar causation, as well as related effects.

Figure 1:
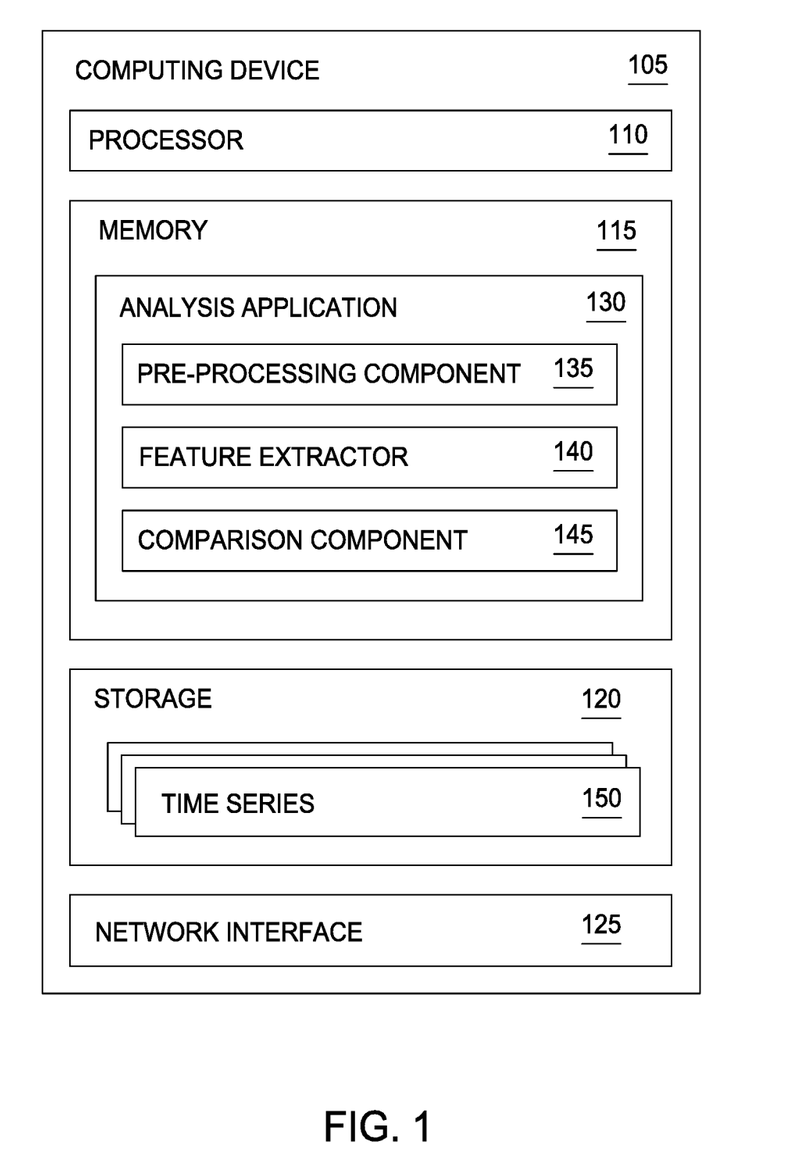
FIG. 1 illustrates a block diagram of a computing device capable of implementing one embodiment of the present disclosure.

FIG. 1 illustrates a block diagram of a Computing Device 105 configured to implement one embodiment of the present disclosure. The illustrated Computing Device 105 includes a Processor 110, Memory 115, Storage 120, and Network Interface 125. In the illustrated embodiment, the Processor 110 retrieves and executes programming instructions stored in the Memory 115 as well as stores and retrieves application data residing in Storage 120. Processor 110 is representative of a single CPU, multiple CPUs, a single CPU having multiple processing cores, and the like. In some embodiments, the Processor 110 may additionally or alternatively include one or more GPUs. Memory 115 is generally included to be representative of a random access memory. Storage 120 may be a disk drive or flash-based storage device, and may include fixed and/or removable storage devices, such as fixed disk drives, removable memory cards, or optical storage, network attached storage (NAS), or storage area-network (SAN). Additionally, the Network Interface 125 is used to communicatively link the Computing Device 105 to other devices via one or more networks (e.g., the Internet).

As illustrated, the Memory 115 includes an Analysis Application 130, which is used to compare time series data based on the surrounding context. The Analysis Application 130 includes a Pre-processing Component 135, a Feature Extractor 140, and a Comparison Component 145. In an embodiment, the Pre-Processing Component 135 processes the time series data in order to facilitate the time series analysis. For example, in one embodiment, the time series constitutes numerical values at discrete moments in time. In some embodiments, the time series must be converted to a sequence of symbols or characters in order to facilitate generation of the feature vector. That is, in some embodiments, a feature vector cannot be generated for the time series data until the Pre-Processing Component 135 first translates the time series data into a series of symbols, as opposed to numerical data. In some embodiments, Pre-Processing Component 135 may additionally perform other operations on the time series data, such as defining time segments, smoothing operations, removal of outliers or glitches, and the like.

In one embodiment, converting the numerical time series data to a sequence of symbols involves identifying patterns in the data and assigning a symbol to each pattern. For example, in one embodiment, the Pre-Processing Component 135 attempts motif hunting to find typical motifs (e.g., patterns) in the data, as well as recognition to determine where each motif occurs in the series. A fixed symbol set can then be used (e.g., one symbol per motif) to encode the series as a sequence of such symbols or characters.

In one embodiment, in order to convert the time series data to a sequence of symbols, the Pre-Processing Component 135 delineates the time series into segments of equal length. In some embodiments, the length of each segment is user-defined. In one embodiment, once the segments are created, the segments are clustered based on the data values within each segment. The Pre-Processing Component 135 may then assign a symbol or character to each cluster, and thereby represent the original time series as a sequence of symbols. That is, each segment is associated with the symbol assigned to the cluster to which the segment belongs, and the time series is encoded as a sequence of such symbols. In some embodiments, the numerical time series data must be converted to the sequence of symbols because the neural network is not configured to process numerical data.

In some embodiments, the Pre-Processing Component 135 may limit the number of clusters to a predefined number. In some embodiments, the Pre-Processing Component 135 may generate multiple sets of clusters using time series segments of varying length, in order to find an optimal clustering. That is, in one embodiment, the Pre-Processing Component 135 may delineate the time series into segments of a first size and cluster those segments into a first set of clusters, and also delicate the time series into segments of a second size and cluster those into a second set of clusters. In such an embodiment, the Pre-Processing Component 135 may then proceed to select the most optimal set of clusters (e.g., the set of clusters with the least inter-cluster similarity, the highest intra-cluster similarity, and the like), and process the time series based on the best set of clusters.

In the illustrated embodiment, the Feature Extractor 140 is used to generate a feature vector for the selected window (s) of time. This allows comparison of the time series data based on the corresponding context. Generally, the feature vector for the selected window is generated based at least in part on the context of the window (e.g., based on the surrounding data). For example, in one embodiment, the time series is used to train a neural network, and the weights associated with the middle layer(s) of the neural network are extracted to form the feature vector for the selected window of time. This process is discussed in more detail below, with reference to FIG. 3.

Once the feature vector is created, the Comparison Component 145 may compare the generated feature vector with feature vectors representing windows of time in other data series. For example, in one embodiment, the Comparison Component 145 computes the cosine similarity for the feature vectors, in order to generate a similarity measure indicating how similar the associated time series are. Advantageously, because the feature vectors are based on the context of the windows rather than simply the data in the window, the Comparison Component 145 captures the semantic distance (as opposed to the syntactic distance or numeric differences) between the specific time segments (e.g., windows of time). In various embodiments, this similarity measure can be used in a variety of ways. For example, if the user wants to predict the time series that will follow the selected window, the selected context may include the subsequent time series. By generating a feature vector for the window based on the subsequent data, similar windows of time in different time series can be identified to help predict the likely future data for the selected time series, as will be discussed in more detail below.

In the illustrated embodiment, the Storage 120 includes a number of Time Series 150. In one embodiment, each Time Series 150 corresponds to a data sequence that has been processed by the Analysis Application 130. That is, in one embodiment, each Time Series 150 includes a generated feature vector for at least one selected window of interest in the time series. In this way, when a new time series is received and processed, the Analysis Application 130 can compare the generated feature vector to each other Time Series 150 that has already been processed and stored. This allows for the identification of Time Series 150 that may be similar to the current series.

Figure 2:
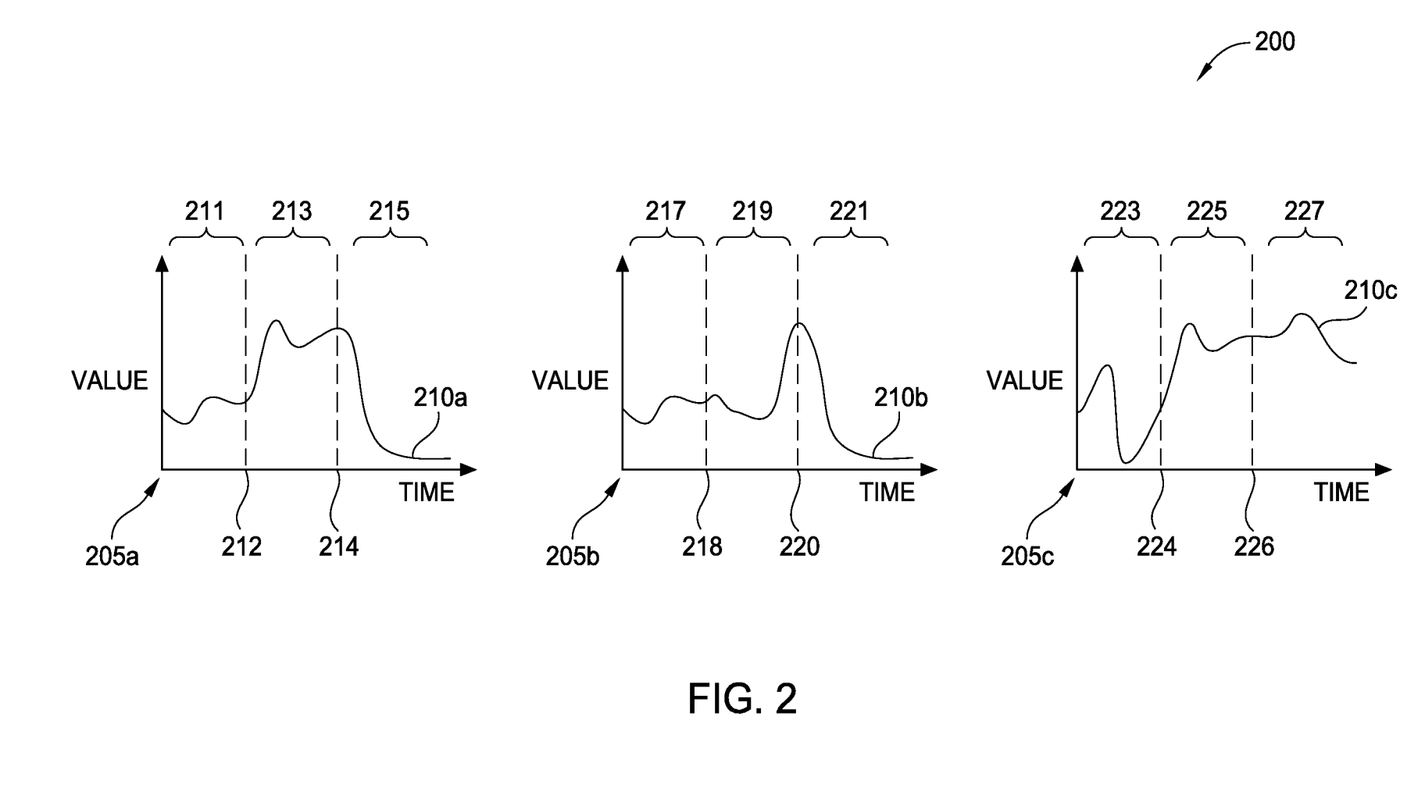
FIG. 2 includes several graphs plotting time series data as a function of time, according to one embodiment disclosed herein.

FIG. 2 includes several Graphs 200 plotting various time series data as a function of time, according to one embodiment disclosed herein. The depicted time series data may include any type of data that is collected over time. For example, in embodiments, the time series data may include data relating to geophysical measurements (e.g., temperature, sea level, wind speed, and the like), energy usage, computing resource usage, population, congestion, energy levels, healthcare data (e.g., blood pressure, heart rate, etc.) and any other data that may be collected over a window of time. Each Graph 205a-c includes plots a respective Time Series 210a-c as a function of time. As illustrated, time is graphed on the horizontal axis, and the data value in the Time Series 210a-c at the corresponding time is graphed on the vertical axis.

In the illustrated embodiment, the Time Series 210a-c are depicted as a continuous function. In embodiments, the each Time Series 210a-c may instead comprise a sequence of discrete data points (e.g., once every second, every thirty seconds, every minute, every hour, and the like). In embodiments, as the data interval is reduced and the number of samples is increased, the resulting time series approximates a smooth continuous series of data, despite its discretized nature. Similarly, in the illustrated embodiment, the data values may take any value (e.g., the data series may transition smoothly from a lower value to a higher value). In some embodiments, however, the time series are quantized into discrete data values (e.g., the observed data value may be rounded to the nearest integer at each moment in time). Embodiments of the present disclosure may be applied regardless of whether the time series data is discrete or continuous, and regardless of whether the data is quantized or not.

The illustrated Time Series 210a-c are each divided into three segments relating to an identified window of interest in each. For example, in Graph 205a, if the window 213 is selected, then the segments 211 and 215 correspond to the context of the selected window of interest. Specifically, the portion 211 of the Time Series 210a corresponds to the preceding data, and the portion 215 corresponds to the subsequent data. In one embodiment, a user can define the window of interest to be compared to other time series. For example, in the illustrated embodiment, the user may define the time period between time 212 and 214 as the window of interest for which similar time series should be retrieved. In some embodiments, this window may be freely selected. In some embodiments, the user selects from predefined segments in the time series, and the time markers 212 and 214 correspond to the edges of the predefined segments. For example, in such an embodiment, the segment 213 may correspond to one day, while the segment 211 corresponds to the prior day and segment 215 corresponds to the subsequent day.

In some embodiments, the preceding and subsequent time segments (211 and 215, respectively) are cover the same length of time as the selected time Window 213. In other embodiments, the preceding and subsequent segments 211 and 215 may be longer or shorter than the selected Window 213. In some embodiments, the size of the context (e.g., the length of time before and/or after the Window 213 that is to be considered) is user-configurable. In some embodiments, similarity measures are generated based on each varying length of time included within the context. For example, in such an embodiment, separate similarity measures may be generated utilizing only the preceding hour of data, the preceding and subsequent hour of data, the preceding two hours of data, the preceding and subsequent two hours of data, and the like. In this way, the user can more readily determine the similarity between each window, depending on the selected context.

As illustrated, the Graph 205b similarly includes a Time Series 210b divided into three segments 217, 219, and 221 (defined by timestamps 218 and 220). Additionally, the illustrated embodiment includes Graph 205c, which illustrates a Time Series 210c divided into three segments 223, 225, and 227 (defined by timestamps 224 and 226). Suppose that the user wishes to determine whether the Window 213 is more similar to Window 219 or Window 225. If only the data values within the Windows 213, 219, and 225 are considered, Window 225 would be returned as the most similar. That is, as illustrated, the data values within Window 213 and Window 225 follow similar paths. In Windows 213 and 225, the data begins at an intermediate value, increases to a relatively higher level, and then drops slightly before leveling out at the higher value. In Window 219, in contrast, the data values begin at an intermediate value and remain relatively low until the value spikes towards the end of the Window 219.

If, however, the context of the Windows 213, 219, and 225 are considered, the resulting similarity measures differ. For example, as discussed above, the Analysis Application 130 may generate a feature vector for the Window 213 based off of the preceding and/or subsequent segments 211 and 215. Similarly, in embodiments, the Analysis Application 130 may generate feature vectors for each Window 219 and 225 based on their respective contexts. By comparing these generated feature vectors corresponding to each Window 213, 219, and 225 (which are generated based on their respective contexts), the Analysis Application 130 can determine that the Window 219 is more similar to the Window 213. That is, although the data values within each Window 213 and 219 appear distinct, their surrounding contexts (e.g., the data values in the segments 211, 215, 217, and 221) are much more similar.

In this way, the Analysis Application 130 may determine that the Time Series 210b (or more specifically, Window 219) is more similar to the selected Window 213, based on the surrounding context. In embodiments, this allows classifying the Windows 213 and 219 into the same category, because the data values captured within each Window 213 and 219 may be caused by the same events (e.g., as reflected in the preceding segments 211 and 217) and may lead to the same consequences (e.g., as represented by subsequent segments 215 and 221). This allows for a deeper understanding of the temporal causes and effects that can be identified in the data, as opposed to merely comparing the data within the selected window. In some embodiments, this comparison can be used to generate predictions about the future. For example, suppose that the data in segment 215 was unavailable (e.g., because time 214 is the current time, and the segment 215 has not yet occurred). Utilizing the above-discussed comparison, the Analysis Application 130 may determine that in the coming segment, it is likely that the data value will drop precipitously. That is, because the Analysis Application 130 has determined that the Window 213 is quite similar to the Window 219 (based on their preceding contexts), it can be predicted that the time segment following Window 213 will likely be similar to the segment that followed Window 219.

In various embodiments, the Analysis Application 130 may take a variety of actions based on the determined similarities. For example, as discussed above, the Analysis Application 130 may determine that the data values represented by the Time Series 210a are likely to drop significantly in the next time segment. In one embodiment, the Analysis Application 130 may provide an indication to the user, such that the user can prepare for the drop. For example, if the data values represent temperature in a greenhouse, the user may enable more heaters preemptively. Similarly, if the Time Series 210a corresponds to energy or computing resource requirements, the load can be better balanced by understanding the upcoming needs.

In some embodiments, the Analysis Application 130 may itself trigger these changes (as opposed to indicating to the user that the change should be made). For example, in one embodiment, the Analysis Application 130 may generate and transmit a control signal to automatically control computing resources for the upcoming time segment, or to activate heaters in a temperature controlled space. In this way, the Analysis Application 130 enables proactive control of the systems utilizing on predictions generated based on the context of the selected window, as opposed to reactive control based on responding to the shifts and changes as they occur.

Figure 3:
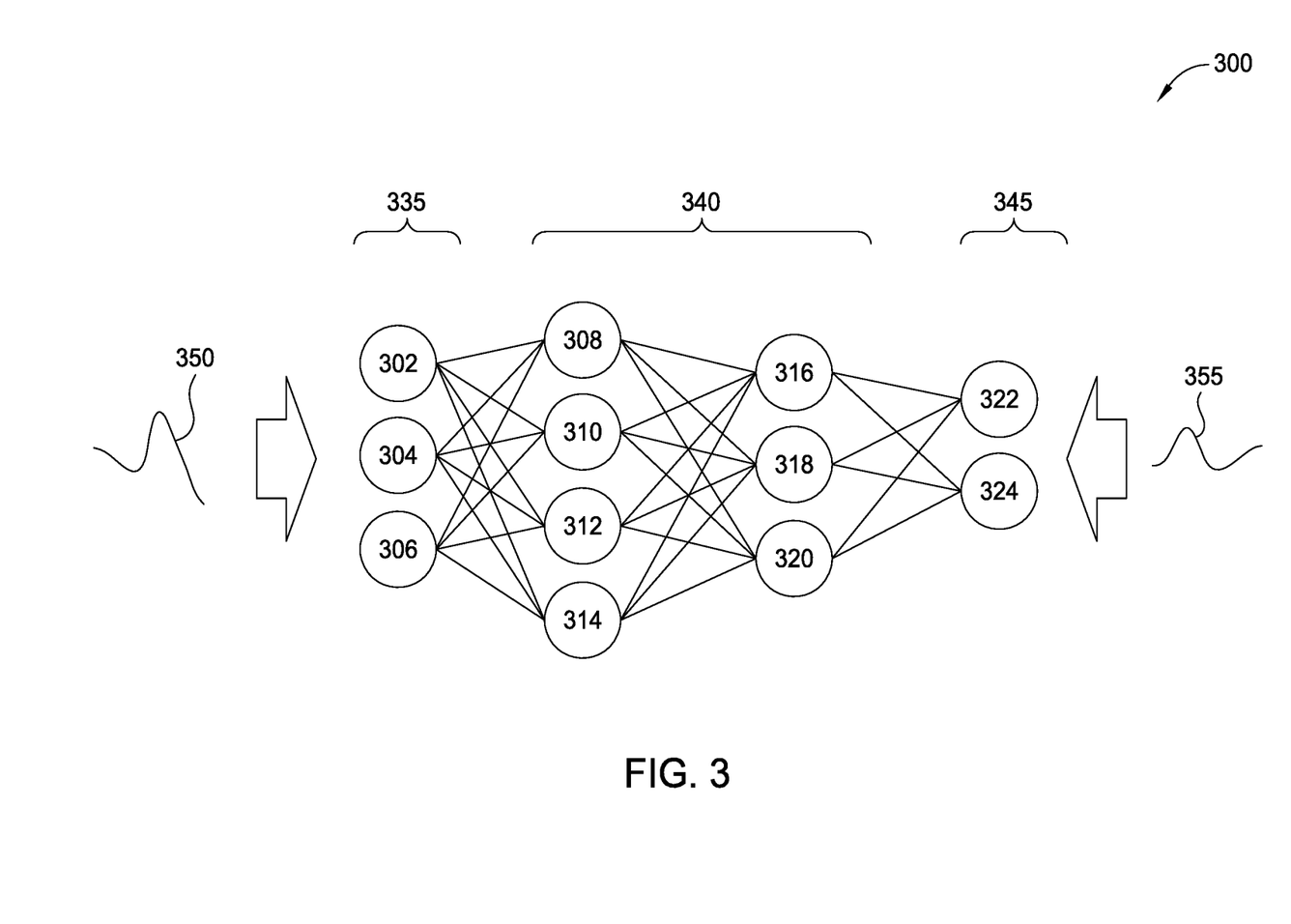
FIG. 3 illustrates a neural network used to compare time series, according to one embodiment of the present disclosure.

FIG. 3 illustrates a Neural Network 300 used to compare time series, according to one embodiment of the present disclosure. As discussed above, in some embodiments, the feature vector for the selected time window is generated utilizing a neural network. In the illustrated embodiment, the Neural Network 300 includes a plurality of Nodes 302-324 (often referred to as neurons) and is trained to generate an output Time Series 355 when provided with an input Time Series 350. The Neural Network 300 can generally be logically divided into three portions: the Input Layer 335, Output Layer 345, and one or more Middle Layer(s) 340. In the illustrated embodiment, the Neural Network 300 includes two Middle Layers 340. In other embodiments, the Neural Network 300 may include any number of Middle Layers 340 (including a single Middle Layer 340). In the illustration, each of the layers is fully connected. That is, each neuron is connected to every other neuron in the previous and subsequent layer. In some embodiments, however, one or more of the layers are not fully connected and can have any arrangement of connections.

In order to train the Neural Network 300, an input Time Series 350 is provided as input to the Neural Network 300. The Neural Network 300 maps the input to the output through its various layers. The resulting output (at Output Layer 345) is then compared to the target Time Series 355. This comparison is evaluated using a loss function, and the calculated loss is propagated through the Neural Network 300 backwards to adjust the weights at each layer/node. Once this training process has been completed, the Neural Network 300 can generate an output highly similar to the target Time Series 355 when it receives the input Series 350. Specifically, the Neural Network 300 is trained by providing each time window and corresponding context. As discussed above, in some embodiments, the time series are first converted to a sequence of characters by the Pre-Processing Component 135 prior to being processed by the Feature Extractor 140. That is, although the input is illustrated as a Time Series 350, the actual data structure used as input may be a string of characters, or a vectorized representation of the string of characters, as will be discussed in more detail below.

In one embodiment, the Neural Network 300 is trained to generate Time Series Data 355 corresponding to the window of interest when provided with the associated context Time Series Data 350. That is, in one embodiment, the Feature Extractor 140 trains the Neural Network 300 to produce a time series data segment corresponding with the Window 213 in Time Series 210a, based on the associated context (e.g., the segments 211, 215, or both). For example, in such an embodiment, the Feature Extractor 140 may first determine the desired context (e.g., whether other time series are to be compared to the selected Window 213 based on the preceding segment 211, the subsequent segment 215, or both, as well as the amount of context to include). The Feature Extractor 140 may then provide this determined context to the Neural Network 300 as input, as well as providing the selected Window 213 as the target output. In this way, the Neural Network 300 is trained to generate the Window 213 when provided with the associated context of the window.

In another embodiment, the Neural Network 300 is instead trained to generate a Time Series 355 corresponding to the context of the window of interest when provided with the selected window. That is, in one embodiment, the Feature Extractor 140 trains the Neural Network 300 to produce a time series corresponding with the context surrounding the Window 213 in Time Series 210a, based on receiving the Window 213. For example, in such an embodiment, the Feature Extractor 140 may first determine the desired context (e.g., whether other time series are to be compared to the selected Window 213 based on the preceding segment 211, the subsequent segment 215, or both). The Feature Extractor 140 may then provide the Window 213 to the Neural Network 300 as input, as well as providing the determined context as the target output. In this way, the Neural Network 300 is trained to generate the associated context when provided with the Window 213.

In an embodiment, each node in the Middle Layer(s) 340 includes one or more weights that are adjusted based on this training process, so that the appropriate Time Series 355 is generated given the input Series 350. In one embodiment, after training the Neural Network 300 using all of the Time Series 150 available, the weights from the one or more Middle Layers 340 are extracted and used to produce a feature vector for each window of time, as will be discussed in more detail below. In some embodiments, the weights may be manipulated or processed prior to creation of the feature vector (e.g., the weights may be rounded, scaled, etc.).

In some embodiments, the generated feature vector for each time series window corresponds to a specified context (e.g., preceding or subsequent) of a specified size (e.g., the duration of the context). In some embodiments, the feature vector for a window is based on the entire context (e.g., both the preceding and subsequent time segments). In some embodiments, the Feature Extractor 140 may generate multiple feature vectors (e.g., one that is based on the preceding context, one based on the subsequent context, and one that is based on consideration of both the preceding and the subsequent context). In so doing, the Analysis Application 130 can readily compare Time Series 150 based on the preferred context.

Additionally, in some embodiments, the Feature Extractor 140 generates one or more feature vectors for all defined segment of time in each Time Series 150 based on the associated context for each segment. For example, in addition to generating one or more feature vectors for the Segment 213 based on the context (Segment 211 and/or Segment 215), the Feature Extractor 140 may also generate one or more feature vectors for Segment 215 based on the corresponding context (Segment 213, the subsequent segment, or both). Similarly, the Feature Extractor 140 may generate one or more feature vectors for the Segment 211 based on its corresponding context (Segment 213 and/or the preceding time segment). In an embodiment, each of these feature vectors is stored along with the Time Series 150 so it can be compared with newly generated feature vectors. In this way, when a user-selected window of interest is received and processed, it can readily be compared to each segment of each Time Series 150.

Figure 4:
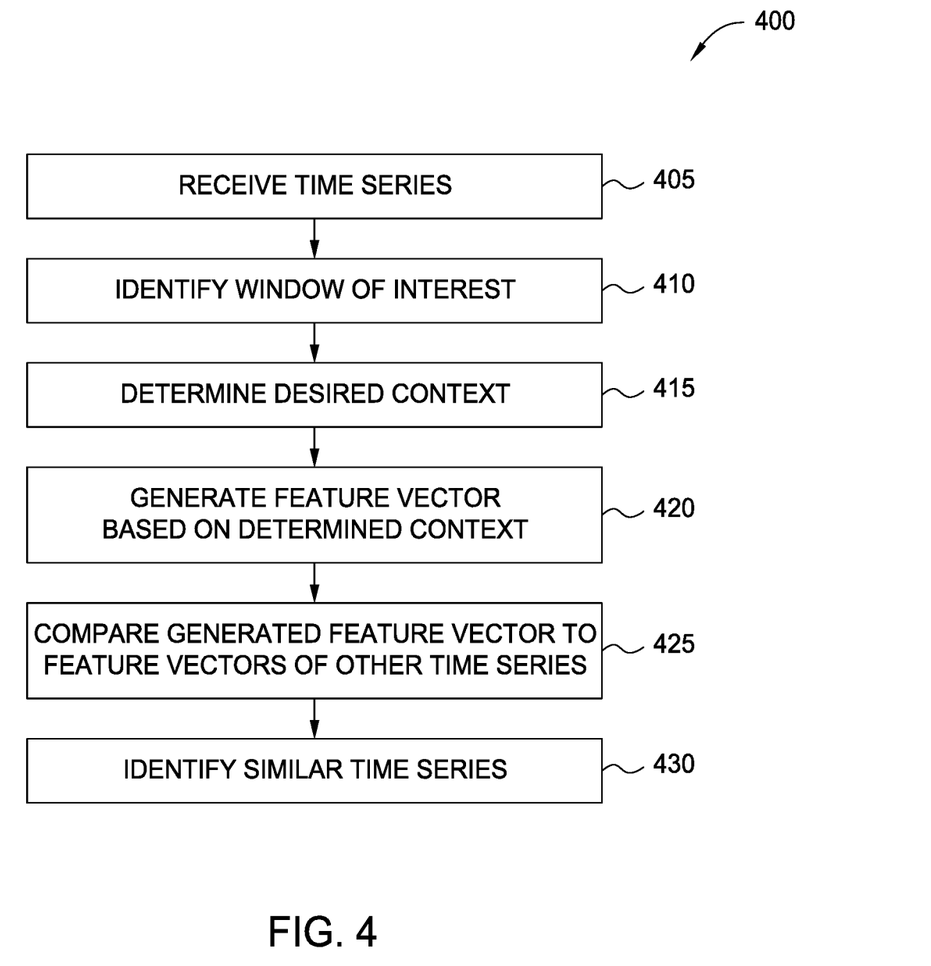
FIG. 4 is a flow chart illustrating a method of comparing time series, according to one embodiment disclosed herein.

FIG. 4 is a flow chart illustrating a method 400 of comparing time series, according to one embodiment disclosed herein. The method 400 begins at block 405, where the Analysis Application 130 receives a time series. As discussed above, the time series includes a series of data points or sequence of data corresponding to an interval of time. At block 410, the Analysis Application 130 identifies the window of interest. In some embodiments, this window may be specified by the user. In some embodiments, the Analysis Application 130 may process each time segment within the received time series, in order to generate corresponding feature vector(s) for each individual time segment. These feature vectors may be stored for future use. That is, in one embodiment, the Analysis Application 130 may generate a feature vector based on the surrounding context of each individual segment in the time series, rather than only the identified window of interest. In this way, the Analysis Application 130 can compare a user-selected window in a new received time series with all other windows in all other Time Series 150 that have been processed.

At block 415, the Analysis Application 130 determines the desired context that should be considered when identifying similar Time Series 150. For example, in an embodiment, the desired context may be the preceding segments, the subsequent segments, or both. Similarly, as discussed above, in some embodiments, the desired context may include an indication of how much data before and/or after the window should be considered in generating the feature vector. At block 420, the Feature Extractor 140 generates a feature vector for the selected window (or for each window, as discussed above). At block 425, the Comparison Component 145 compares the generated feature vector to each other Time Series 150. That is, as discussed above, in one embodiment, each Time Series 150 stored in Storage 120 has one or more feature vectors associated with it that have already been generated by the Feature Extractor 130. Additionally, in an embodiment, each generated feature vector is associated with a particular segment or window in a Time Series 150, to permit identification of the related Time Series 150, as well as the particular similar segment within the Time Series 150.

In one embodiment, the Comparison Component 145 generates a plurality of similarity measures by comparing the selected window in the received time series to each Time Series 150 in Storage 120, according to the determined context. In some embodiments, as discussed above, the generated feature vectors are based on both the preceding and subsequent context. In such an embodiment, a single similarity measure may be generated that accounts for both the preceding and subsequent context. In some embodiments, separate feature vectors are defined for the preceding and subsequent context. In one embodiment, the Comparison Component 145 may generate a preceding similarity measure based on the preceding context, as well as a subsequent similarity measure based on the subsequent context. In an embodiment, these measures may then be combined to generate a unified window similarity, according to one embodiment.

Based on these comparisons, at block 430, the Analysis Application 130 identifies similar Time Series 150, or specific windows or segments within a Time Series 150. For example, if the user provides a time series with an indicated window of interest, the Analysis Application 130 may return a list of windows of time in other Time Series 150, sorted according to their similarity to the provided window. In some embodiments, the Analysis Application 130 identifies and provides any matches that exceed a predefined threshold. For example, in one embodiment, the similarity measure ranges from zero to one, and all matches exceeding a threshold are provided. In some embodiments, the threshold is user-defined. In some embodiments, the Analysis Application 130 returns a predefined number of matches, sorted according to their similarity measures.

In some embodiments, the generated similarity measures are used to train one or more machine learning models to predict a future data series corresponding to an input data series. For example, in one embodiment, the subsequent time segment corresponding to a first time window may be provided as the target output of a machine learning model while the first time window is provided as the input. To provide additional data points, in one embodiment, the context of other time windows that are associated with a generated similarity measure exceeding a predefined threshold are also used as target output while the corresponding time window is used as input. That is, in one embodiment, if window A is determined to be similar to window B (e.g., because the generated similarity measure exceeds a predefined threshold), a machine learning model may be trained using the context of windows A and B (e.g., the subsequent data) as the target output with Windows A and B used as the provided input. In this way, one or more machine learning models may be trained, based in part on the determined similarity measures, to receive a time series or time window as input and generate a predictive output series.

Figure 5:
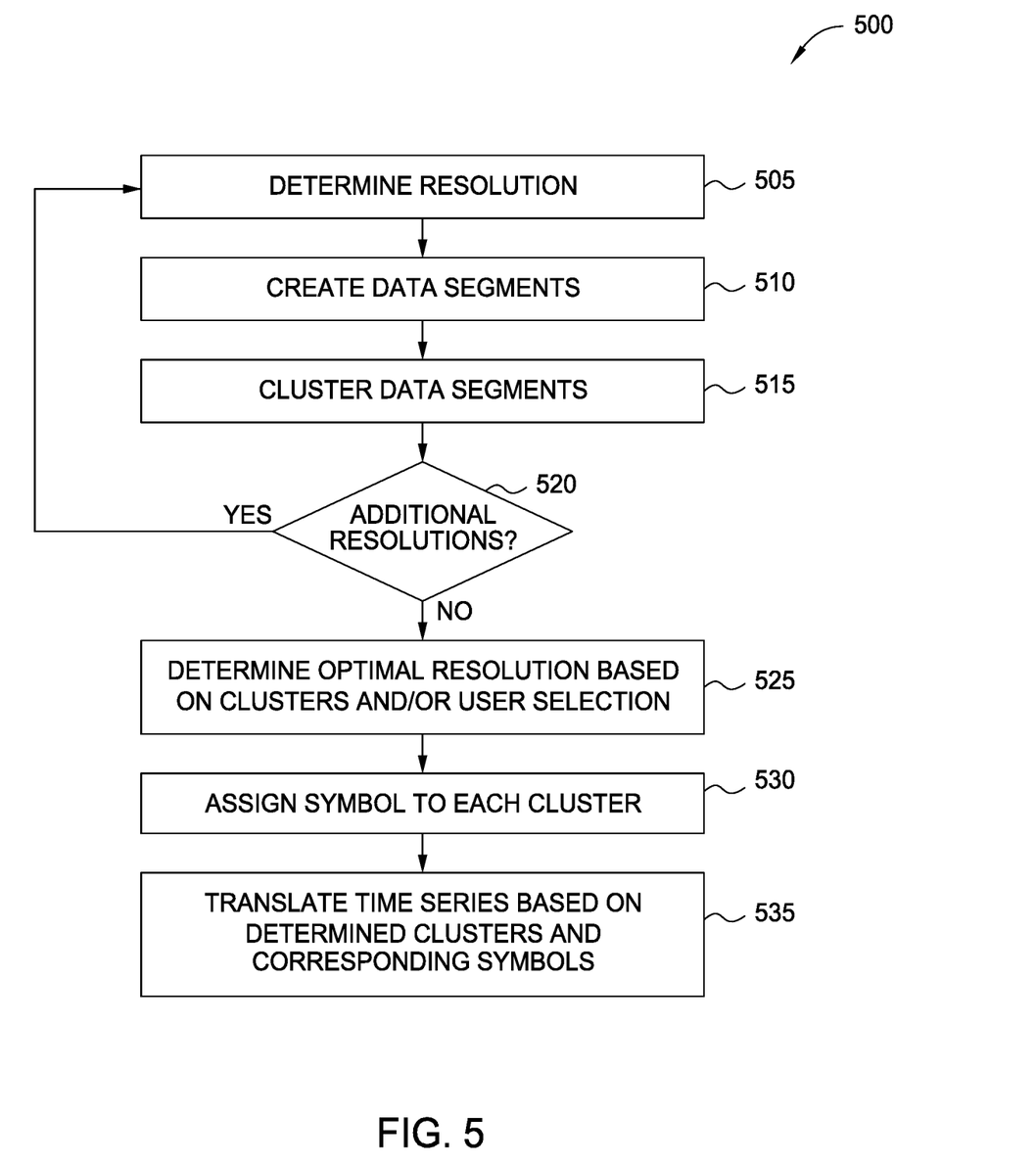
FIG. 5 is a flow chart illustrating a method of processing time series data, according to one embodiment disclosed herein.

FIG. 5 is a flow chart illustrating a method 500 of processing time series data, according to one embodiment disclosed herein. The method 500 begins at block 505, where the Pre-Processing Component 135 selects the resolution to use when processing the data. For example, in one embodiment, the user may instruct the Pre-Processing Component 135 to delineate the data into time segments that each span a predefined period of time, include a predefined number of measurements, and the like. In some embodiments, as discussed above, the Pre-Processing Component 135 may process the data with a number of different resolutions, and select the best one based on the resulting clusters. At block 510, the Pre-Processing Component 135 creates data segments by subdividing the time series into equal-length segments corresponding to the determined resolution. The method 500 then proceeds to block 515, where the Pre-Processing Component 135 clusters the segments based on their similarity. At block 520, the Pre-Processing Component 135 determines whether there are additional resolutions to use. That is, the Pre-Processing Component 135 may determine whether the user has requested that multiple resolutions be used, and if so, whether additional resolutions are yet to be used. In some embodiments, of course, the Pre-Processing Component 135 uses a single predefined resolution. If additional resolutions are available to use, the method 500 returns to block 505.

If there are no additional resolutions (e.g., because the Pre-Processing Component 135 utilizes a single resolution, the user has requested a particular resolution, or all defined resolutions have been used to cluster the data), the method 500 proceeds to block 525, where the Pre-Processing Component 135 determines the optimal resolution based on the clusters and/or the user selection. For example, if the user has defined the desired resolution, that resolution is used. In some embodiments, the Pre-Processing Component 135 compares each of the resolutions to determine which resolution generated clusters with the highest intra-cluster similarity, the lowest inter-cluster similarity, and the like. After determining the optimal resolution, the method 500 continues to block 530, where the Pre-Processing Component 135 the assigns a symbol to each generated cluster. Each symbol may be, for example, a letter or number using alphanumeric characters. The method 500 then proceeds to block 535, where the Pre-Processing Component 135 translates the time series into a sequence of symbols based on the determined clusters and their corresponding symbols. For example, for each time segment in the time series, the Pre-Processing Component 135 determines which cluster it was assigned to, and what symbol is associated with that cluster. The symbol is then used to represent the segment, and the Pre-Processing Component 135 proceeds to the next segment. In this way, a sequence of symbols or characters is created to represent the time series. This sequence of symbols may then be used to train a neural network, as is discussed in more detail below.

Figure 6:
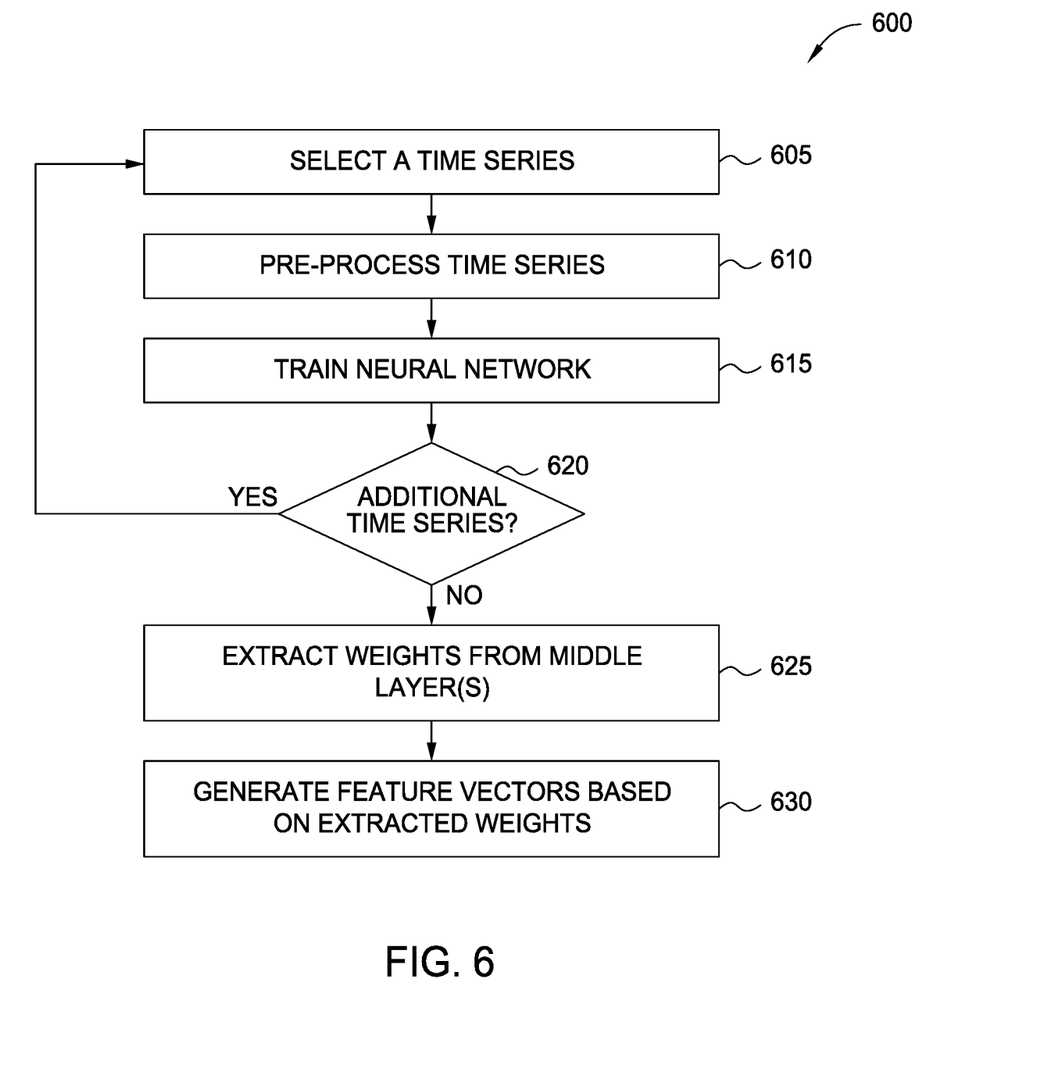
FIG. 6 is a flow chart illustrating a method of generating feature vectors for observation windows in time series data based on the surrounding context, according to one embodiment of the present disclosure.

FIG. 6 is a flow chart illustrating a method 600 of generating feature vectors for observation windows in time series data based on the surrounding context, according to one embodiment of the present disclosure. The method 600 begins at block 605, where the Analysis Application 130 selects a Time Series 150 for processing. At block 610, the Pre-Processing Component 135 pre-processes the time series. For example, as discussed above, the Pre-Processing Component 135 may attempt motif hunting, delineate the time series into a plurality of equal-length segments and cluster the delineated segments, and the like. Each cluster, motif, or pattern may then be assigned a symbol such that the time series can be encoded as a sequence of symbols. At block 615, the Feature Extractor 140 trains a neural network. In one embodiment, training the neural network involves providing a neural network with the identified context (e.g., data gathered during an amount of time prior to or subsequent to the identified window of interest, or a vectorized version thereof) as the input, and the identified window of interest as the target output. As discussed above, in some embodiments, this training may be reversed (e.g., the indicated window may be used as the input, and the associated context may be used as the target output). In some embodiments, the method of training is determined based on a user selection.

In order to train the neural network, the Feature Extractor 140 generally utilizes pairs of data from a window in the time series and the corresponding context. As discussed above, As an example, suppose the symbol set used to encode a particular time series are "A", "B", "C", "D", "E", and "F". That is, in this example, six clusters or motifs are identified in the time series segments. Suppose further that the identified window has been encoded by the Pre-Processing Component 135 as "CD," the preceding context is encoded as "AB," and the subsequent context is encoded as "EF," such that the entire string for the time series data is "AB|CD|EF" where the window of interest is delineated by vertical bars. Of course, in embodiments, the same symbol may be present both in the context and in the window, if similar time series data is present in each.

In order to train the neural network using this time series data, the Feature Extractor 140 may generate a set of training pairs based on this sequence of symbols. For example, the set of training pairs in the above example may include (C,A), (C,B), (D,A), and (D,B) if the preceding context is used. As discussed above, these pairs may be provided to train the neural network to generate the context when provided the window, or to generate the window when provided the context. In addition to training pairs utilizing two symbols, in some embodiments, the Feature Extractor 140 may also generate training pairs that include more than two symbols. To continue the above example, the training pairs may include (CD,A), (CD,B), (CD,AB), (C,AB), (D,AB), and the like. In some embodiments, utilizing more than one symbol as the input or target output may require additional complexity in the input and output layers, but the principle remains the same.

In some embodiments, to provide these training pairs to the neural network, the Feature Extractor 140 converts each input and target to a one-hot vector corresponding to the input or target output. Continuing the above example, the inputs and outputs may each be represented by a six dimensional vector, corresponding to the six symbols in the set. The string "A" may be encoded as (1,0,0,0,0,0), "B" encoded as (0,1,0,0,0,0), and so on. In some embodiments utilizing multiple symbols as input or target output, (e.g., "AD"), the corresponding vector may include multiple non-zero dimensions (e.g., (1,0,0,1,0,0)). In some embodiments, the particular training pairs utilized may depend on the neural network architecture, or may be selected by a user. That is, a user may specify to only use single-symbol strings, strings with two or fewer symbols, any size strings, and the like.

Once the neural network has been thus trained for the selected time series, the method 600 proceeds to block 620, where the Feature Extractor 140 determines whether there are additional Time Series 150 to use to train the network. If so, the method 600 returns to block 605 to select the next time series. If not, the method 600 continues to block 625, where the Feature Extractor 140 extracts the weights from the middle layer(s) of the neural network, as discussed above. For example, the Feature Extractor 140 may extract the weight matrix from the middle layer(s). Finally, at block 630, the Feature Extractor 140 generates feature vectors for one or more windows of interest based on those extracted weights. In one embodiment, in order to generate the feature vector for a particular window of time, each of the symbols within the window are replaced with the corresponding vector specified by the weight matrix. In an embodiment, the extracted weight matrix includes a number of rows equivalent to the number of symbols utilized. For example, if N symbols are used to translate the time series data, the weight matrix will have N rows. In some embodiments, the width of the weight matrix (i.e., the number of columns), may vary depending on the particular architecture selected by the administrator or user (e.g., depending on the number of neurons that are used in the middle layer(s)).

To continue the above example, if six symbols are utilized, the resulting weight matrix will have six rows. Suppose further that the neural network has 300 hidden neurons. In such an embodiment, the resulting weight matrix will have 300 columns and the generated feature vectors for each symbol will have 300 dimensions. In order to identify the vector corresponding to a given symbol, the appropriate row in the weight matrix must be selected. For example, if the symbol "A" is encoded as (1,0,0,0,0,0) when training the network, then the first row in the weight matrix is the 300-dimension vector corresponding to "A." In this way, the Feature Extractor 140 may replace each symbol in the identified window with its corresponding feature vector. Once this is completed, vector addition can be used to generate a single feature vector representing the window of time. That is, if the window of time is encoded as "CD," the feature vector for "C" is $V_C$, and the feature vector for "D" is $V_D$, then the feature vector for the string "CD" is $V_C+V_D$. In this way, a feature vector is generated for each indicated window of time, based on the associated surrounding context (as captured in the weights of the trained neural network).

In some embodiments, when comparing two time series, both time series have been used to train the neural network. In some embodiments, however, a time series that has not been used to train the neural network can be converted to a feature vector using the above described method. In some embodiments, the Analysis Application 130 may retrain or refine the neural network with new time series data that is received. For example, in one embodiment, the Analysis Application 130 periodically refines the neural network with new time series (e.g., once a day). In some embodiments, the Analysis Application 130 retrains the neural network whenever a user initiates the process. In some embodiments, if a user requests processing of a particular identified time series, the Analysis Application 130 determines whether it has been used to train the neural network, and if not, refines the neural network with the time series before returning the feature vector or similarity measurements.

Figure 7:
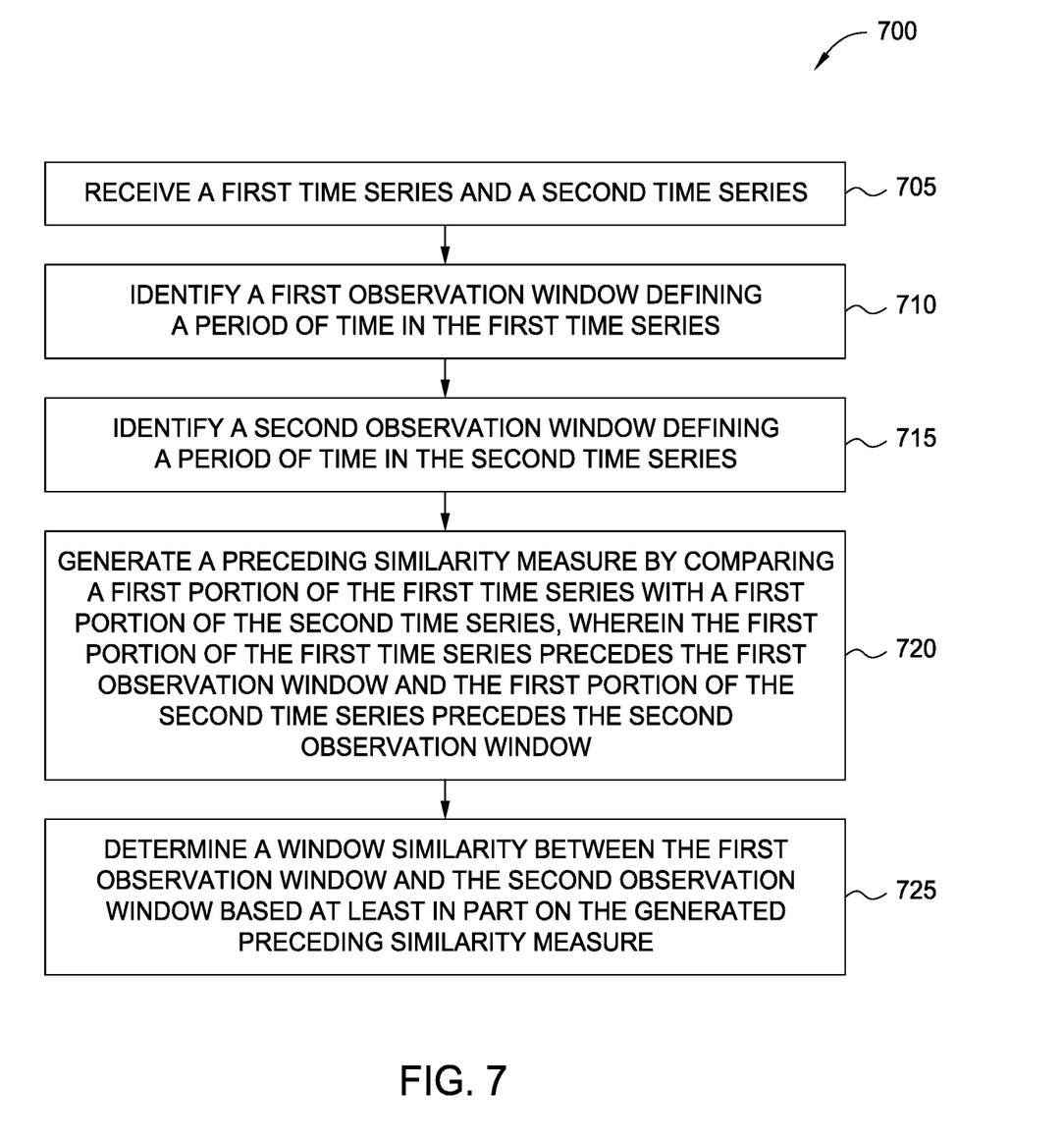
FIG. 7 is a flow chart illustrating a method of comparing time series data, according to one embodiment disclosed herein.

FIG. 7 is a flow chart illustrating a method 700 of comparing time series data, according to one embodiment disclosed herein. The method 700 begins at block 705, where the Analysis Application 130 receives a first time series and a second time series. At block 710, the Analysis Application 130 identifies a first observation window defining a period of time in the first time series, and at block 715, the Analysis Application 130 identifies a second observation window defining a period of time in the second time series. At block 720, the Analysis Application generates a preceding similarity measure by comparing a first portion of the first time series with a first portion of the second time series. The first portion of the first time series precedes the first observation window and the first portion of the second time series precedes the second observation window. Finally, at block 725, the Analysis Application 130 determines a window similarity between the first observation window and the second observation window based at least in part on the generated preceding similarity measure.

Figure 8:
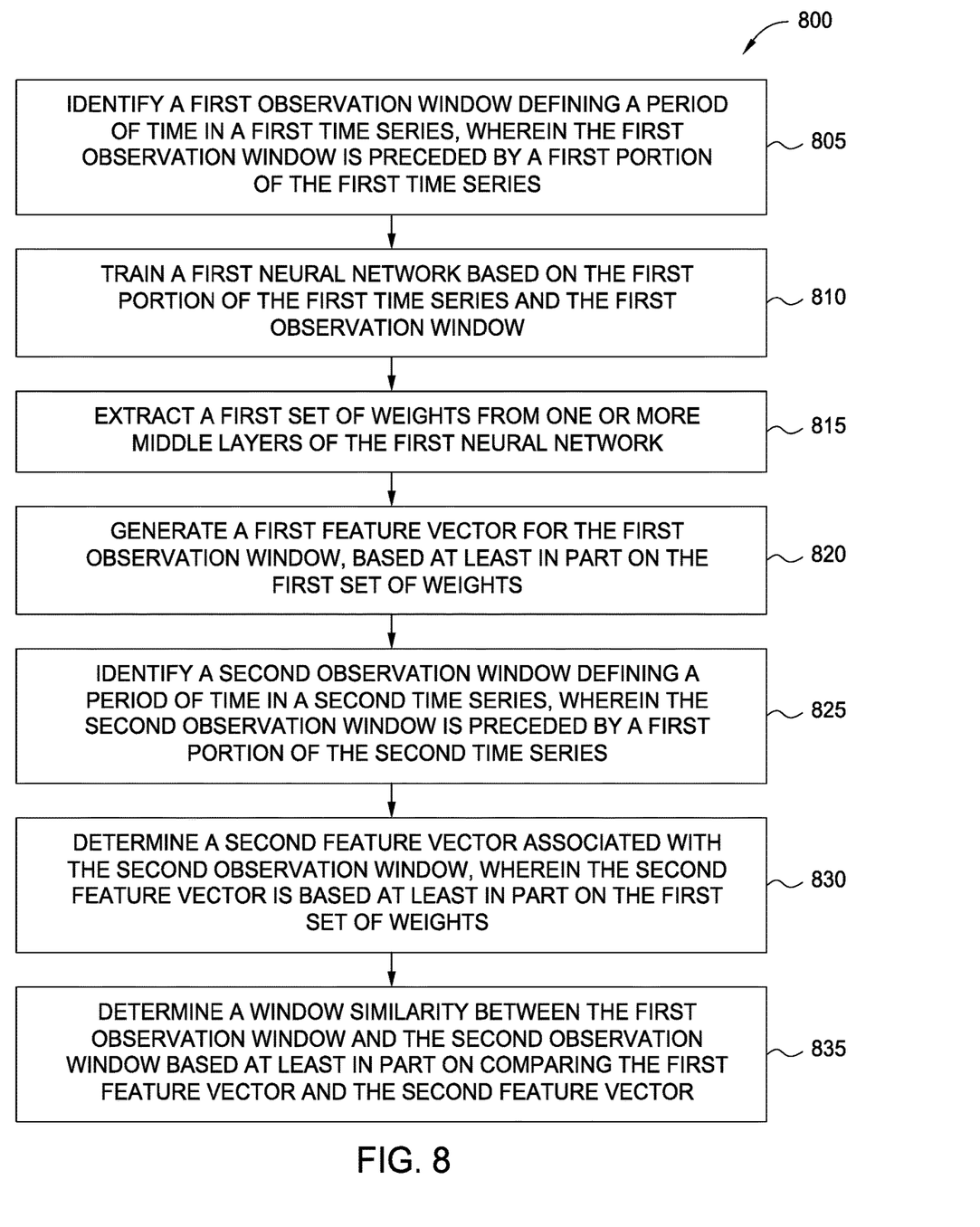
FIG. 8 is a flow chart illustrating a method of comparing time series data, according to one embodiment disclosed herein.

FIG. 8 is a flow chart illustrating a method 800 of comparing time series data, according to one embodiment disclosed herein. The method 800 begins at block 805, where the Analysis Application 130 identifies a first observation window defining a period of time in a first time series, wherein the first observation window is preceded by a first portion of the first time series. The method 800 then continues to block 810, where the Analysis Application 130 trains a first neural network based on the first portion of the first time series and the first observation window. For example, as discussed above, in one embodiment the Analysis Application 130 trains a neural network using the first window as target output with the first portion of the first time series as input. In another embodiment, the Analysis Application 130 trains a neural network using the first portion of the first time series as target output with the first window as input. In some embodiments, this training process is repeated for each available time series. At block 815, the Analysis Application 130 extracts a first set of weights from one or more middle layers of the first neural network, and at block 820, the Analysis Application 130 generates a first feature vector for the first observation window, based at least in part on the first set of weights.

The method 800 then proceeds to block 825, where the Analysis Application 130 identifies a second observation window defining a period of time in a second time series, wherein the second observation window is preceded by a first portion of the second time series. For example, in one embodiment, the Analysis Application 130 may identify the second window because a user has indicated that the first window should be compared to the second window specifically. In some embodiments, the Analysis Application 130 may receive the second time series and perform similar operations to generate a second feature vector. In some embodiments, the Analysis Application 130 compares the received first time series with all other windows of the time series residing in storage. At block 830, the Analysis Application 130 determines a second feature vector associated with the second observation window, wherein the second feature vector is based at least in part on the first set of weights. For example, as discussed above, the Analysis Application 130 may generate the second feature vector in much the same way as the first feature vector. Similarly, in some embodiments, the second feature vector may have been pre-generated (e.g., when the second time series was received) and stored for later use. In such an embodiment, the Analysis Application 130 may retrieve this second feature vector for comparison. Finally, the method 800 proceeds to block 835, where the Analysis Application1 130 determines a window similarity between the first observation window and the second observation window based at least in part on comparing the first feature vector and the second feature vector. For example, as discussed above, in one embodiment, the Analysis Application 130 computes the cosine difference or similarity between the feature vectors.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Analysis Application 130) or related data available in the cloud. For example, the Analysis Application 130 could execute on a computing system in the cloud and compare time series data. In such a case, the Analysis Application 130 could generate and store feature vectors and similarity measures at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
identifying a first observation window defining a period of time in a first time series, wherein the first observation window is preceded by a first portion of the first time series;
training a first neural network based on the first portion of the first time series and the first observation window;
extracting a first set of weights from one or more middle layers of the first neural network;
generating a first feature vector for the first observation window, based at least in part on the first set of weights;
identifying a second observation window defining a period of time in a second time series, wherein the second observation window is preceded by a first portion of the second time series;
determining a second feature vector associated with the second observation window, wherein the second feature vector is based at least in part on the first set of weights; and
determining a window similarity between the first observation window and the second observation window based at least in part on comparing the first feature vector and the second feature vector.

2. The method of claim 1, the method further comprising:
training a second neural network based on the first observation window and a second portion of the first time series, wherein the second portion of the first time series follows the first observation window;
extracting a second set of weights from one or more middle layers of the second neural network; and
generating a third feature vector for the first observation window, based at least in part on the second set of weights, wherein the window similarity is further based on comparing the third feature vector and a fourth feature vector associated with the second observation window.

3. The method of claim 1, wherein training the first neural network comprises training the first neural network to generate the first observation window upon receiving the first portion of the first time series.

4. The method of claim 1, wherein training the first neural network comprises training the first neural network to generate the first portion of the first time series upon receiving the first observation window.

5. The method of claim 3, wherein training the neural network comprises:
generating vectorized representations of the first portion of the first time series and of the first observation window;
using the vectorized first portion of the first time series as input to the first neural network; and
using the vectorized first observation window as target output of the first neural network.

6. The method of claim 5, wherein generating the vectorized representation of the first portion of the first time series comprises:
identifying one or more patterns in the first time series;
assigning a symbol to each identified pattern;
converting the first portion of the first time series into a series of symbols based on the identified patterns and corresponding symbols; and
converting the series of symbols into a vector.

7. The method of claim 1, wherein the first and second observation windows correspond to a section of interest in the first and second time series, respectively.

8. The method of claim 1, the method further comprising:
generating a control signal based at least in part on the determined window similarity, wherein the control signal is adapted to control one or more computer resources; and
transmitting the control signal.

9. The method of claim 1, the method further comprising:
training a machine learning model based at least in part on the determined similarity;
receiving a third time series including a third observation window defining a period of time in the third time series;

processing the third time series with the trained machine learning model to generate a predicted time series.

10. A system, comprising:
one or more computer processors; and
a memory containing a program which when executed by the one or more computer processors performs an operation, the operation comprising:
receiving a first time series and a second time series;
identifying a first observation window defining a period of time in the first time series;
identifying a second observation window defining a period of time in the second time series;
generating a preceding similarity measure by comparing a first portion of the first time series with a first portion of the second time series, wherein the first portion of the first time series precedes the first observation window and the first portion of the second time series precedes the second observation window; and
determining a window similarity between the first observation window and the second observation window based at least in part on the generated preceding similarity measure.

11. The system of claim 10, wherein comparing the first portion of the first time series with the first portion of the second time series comprises:
generating a first feature vector based on the first time series and a second feature vector based on the second time series.

12. The system of claim 11, wherein generating the first feature vector comprises:
training a neural network to generate the first observation window upon receiving the first portion of the first time series;
extracting weights from one or more middle layers of the neural network; and
creating the first feature vector based on the extracted weights.

13. The system of claim 12, wherein training the neural network comprises:
generating vectorized representations of the first portion of the first time series and of the first observation window;
using the vectorized first portion of the first time series as input to the neural network; and
using the vectorized first observation window as target output of the neural network.

14. The system of claim 13, wherein generating the vectorized representation of the first portion of the first time series comprises:
identifying one or more patterns in the first time series;
assigning a symbol to each identified pattern;
converting the first portion of the first time series into a series of symbols based on the identified patterns and corresponding symbols; and
converting the series of symbols into a vector.

15. A computer program product comprising a computer-readable storage medium having computer-readable program code embodied therewith, the computer-readable program code executable by one or more computer processors to perform an operation comprising:
identifying a first observation window defining a period of time in a first time series, wherein the first observation window is preceded by a first portion of the first time series;
training a first neural network based on the first portion of the first time series and the first observation window;
extracting a first set of weights from one or more middle layers of the first neural network;
generating a first feature vector for the first observation window, based at least in part on the first set of weights;
identifying a second observation window defining a period of time in a second time series, wherein the second observation window is preceded by a first portion of the second time series;
determining a second feature vector associated with the second observation window, wherein the second feature vector is based at least in part on the first portion of the second time series; and
determining a window similarity between the first observation window and the second observation window based at least in part on comparing the first feature vector and the second feature vector.

16. The computer program product of claim 15, wherein training the first neural network comprises training the first neural network to generate the first observation window upon receiving the first portion of the first time series.

17. The computer program product of claim 15, wherein training the first neural network comprises training the first neural network to generate the first portion of the first time series upon receiving the first observation window.

18. The computer program product of claim 16, wherein training the neural network comprises:
generating vectorized representations of the first portion of the first time series and of the first observation window;
using the vectorized first portion of the first time series as input to the first neural network; and
using the vectorized first observation window as target output of the first neural network.

19. The computer program product of claim 18, wherein generating the vectorized representation of the first portion of the first time series comprises:
identifying one or more patterns in the first time series;
assigning a symbol to each identified pattern;
converting the first portion of the first time series into a series of symbols based on the identified patterns and corresponding symbols; and
converting the series of symbols into a vector.

20. The computer program product of claim 1, the operation further comprising:
training a machine learning model based at least in part on the determined similarity;
receiving a third time series including a third observation window defining a period of time in the third time series;
processing the third time series with the trained machine learning model to generate a predicted time series.

* * * * *